Aug. 22, 1944.   H. L. WISE   2,356,366
POWER TRANSMISSION
Filed Dec. 4, 1942   3 Sheets-Sheet 3

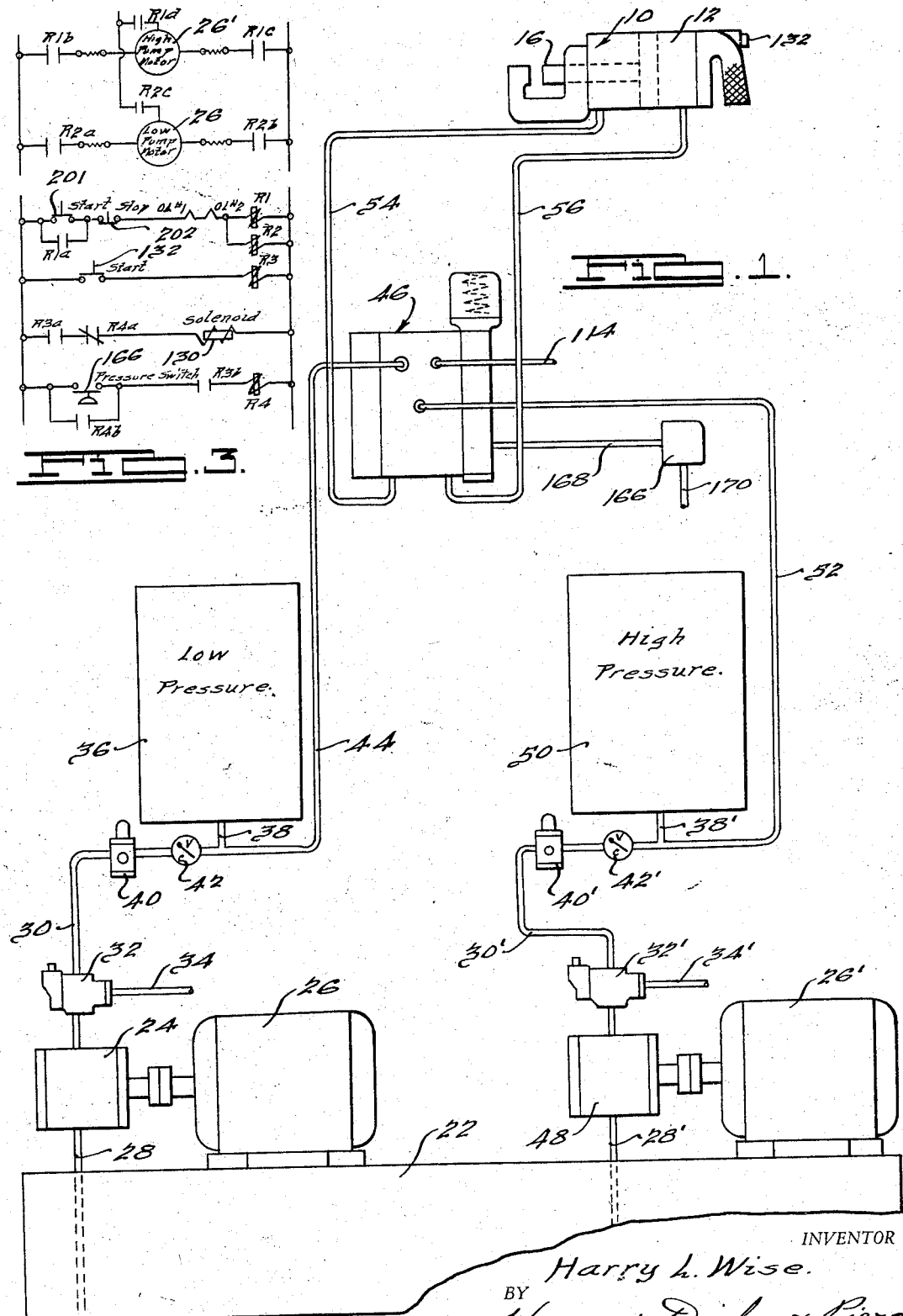

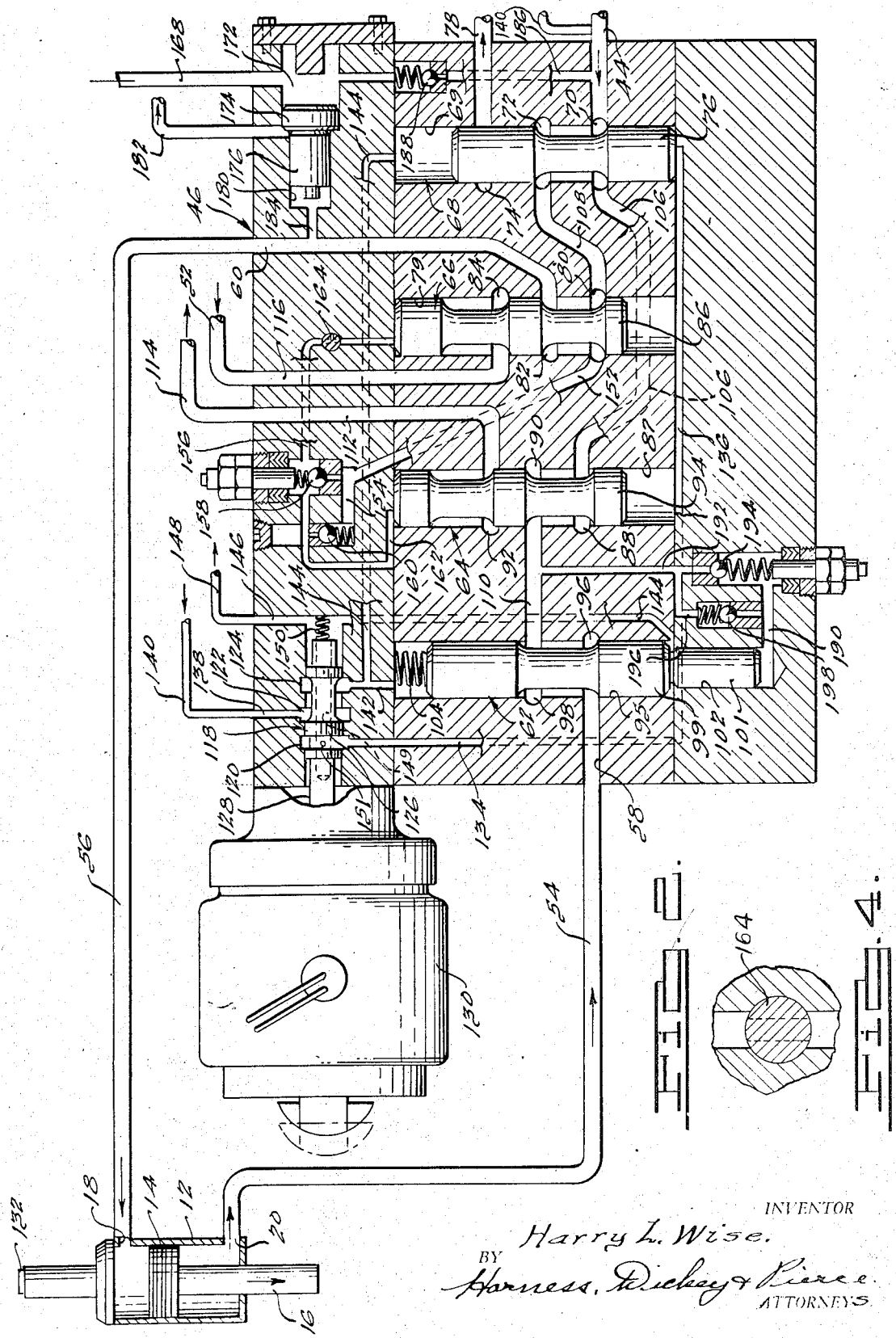

INVENTOR.
Harry L. Wise.
BY
Harness, Dickey & Pierce.
ATTORNEYS.

Patented Aug. 22, 1944

2,356,366

UNITED STATES PATENT OFFICE 2,356,366

POWER TRANSMISSION

Harry L. Wise, Detroit, Mich., assignor to Hydraulic Machinery, Inc., Detroit, Mich., a corporation of Michigan Application December 4, 1942, Serial No. 467,834

9 Claims. (Cl. 121—38)

The present invention relates to power transmission, and particularly relates to a fluid pressure power transmitting and control device.

One of the primary objects of the present invention is to transmit fluid power to a fluid motor and to control such transmission in an improved manner.

A further object of the present invention is to control the supply of fluid to a reciprocating motor at two different pressures, at different stages in the operation of the motor.

A further object of the invention is to control the supply of fluid to a reciprocating motor at high and low pressure so that the motor piston is moved to a work position at the low pressure, the high pressure then admitted to do the work, and the piston returned at the low pressure.

A further object of the present invention is to control the supply of fluid to a reciprocating motor at low and high pressures so that a differential feed is employed to move the piston to the work position at the low pressure and high speed, the high pressure then admitted to do the work, and the piston returned at the low pressure.

Another object of the invention is to provide improved controls of the type mentioned, including an electric control, whereby when the hammer button is depressed and, though it might be held in contact after the piston of the motor returns to its initial position, the cycle cannot repeat until the button is first released.

Other objects of the invention will become apparent from the following specification, the drawings relating thereto, and from the claims hereinafter set forth.

In the drawings, in which like numerals are used to designate like parts in the several views throughout:

Figure 1 is a diagrammatic view of a power transmission system embodying features of the present invention;

Figure 2 is a cross-sectional view of the control panel employed in the system shown in Figure 1, embodying features of the present invention, and showing such control panel in its association with a reciprocating fluid motor;

Figure 3 is a diagrammatic view of the electric control;

Figure 4 is an enlarged partial view showing in greater detail the structure of a portion of Fig. 2.

Figures 5, 6:
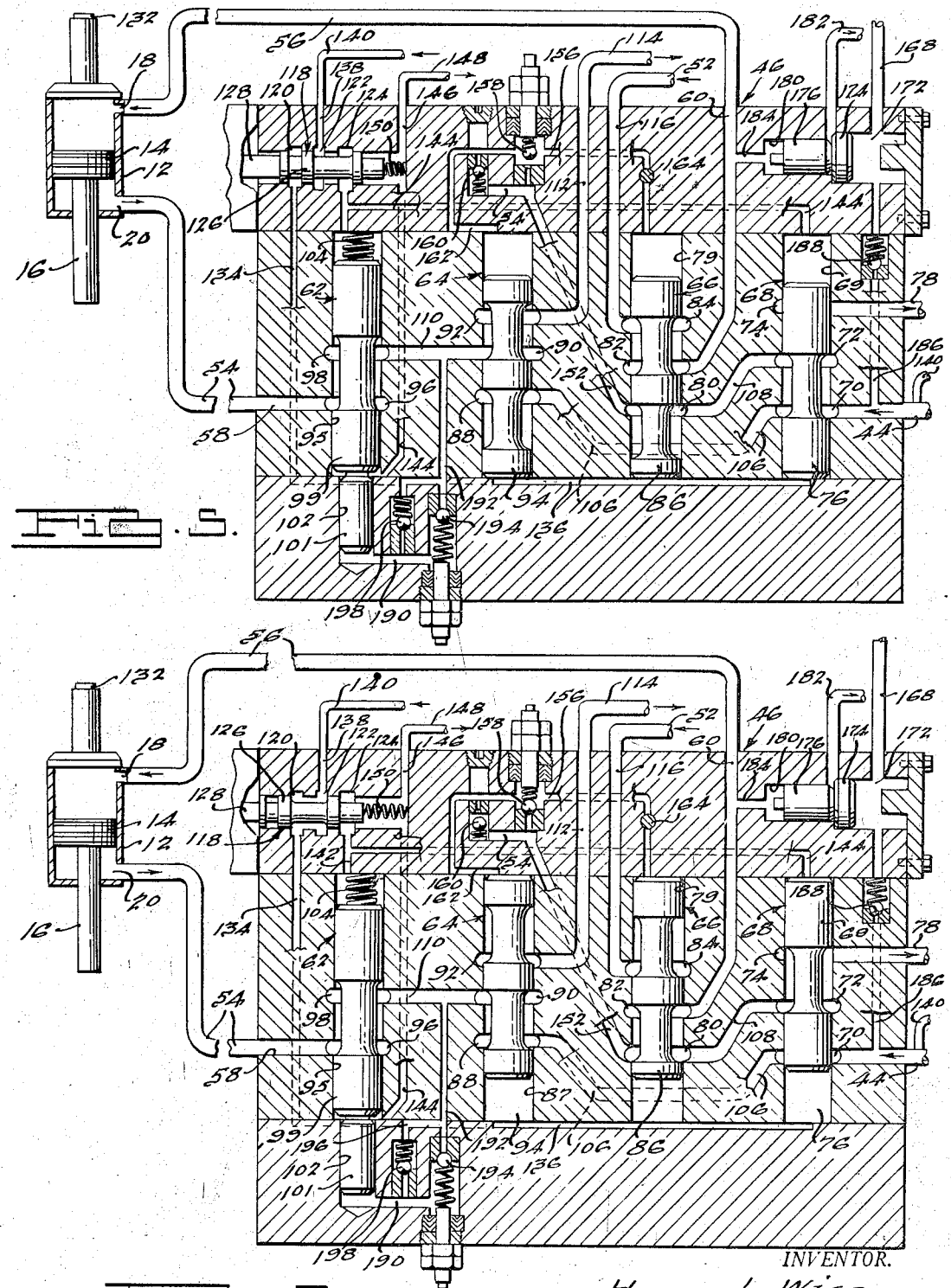
Figs. 5 and 6 are views similar to Fig. 2, with parts removed, showing certain of the elements in different operating positions.

In general, the power transmission system of the present invention embodies the control of flow of a fluid from a low pressure source and from a high pressure source to a fluid operated riveting gun. In the embodiment illustrated, the low and high pressure sources are low and high pressure accumulators from which the fluid is conducted to the riveting gun through a supply line having the fluid control panel of the present invention combined therewith. The fluid control panel of the present invention employs a plurality of valves which are so constructed and arranged that upon the energization of a solenoid by a push button on the hammer, the low pressure is introduced to the gun to move the work element from a retracted position to a work position at the low pressure and at a relatively high speed. The conduits in the control panel and to the gun are such that a differential feed of the piston is accomplished, so that the work element moves to a work position at a relatively high speed, but at the low pressure. Pilot means are constructed in the control panel so that when the piston is moved to its work position the valves are shifted so that the low pressure supply is cut off and the high pressure supply is opened to feed the high pressure fluid to the free end of the piston to do the work at the high pressure. The pilot means then act to de-energize the solenoid so that the solenoid valve is shifted and low pressure fluid acts to return certain of the valves to their initial position to cut off the supply of high pressure fluid to the gun and to return the gun piston to its original position. When the piston returns to its initial or retracted position, the pressure builds up in a pilot line to return the remaining valve to its initial position to thereby complete the cycle.

Referring to the drawings, in which one embodiment is illustrated, an hydraulic riveting gun is generally indicated at 10, which includes a fluid motor comprising a cylinder 12 and a piston 14, having a piston rod 16 associated therewith and projecting through one end of the cylinder 12. The piston rod 16 may be considered the work element. The cylinder 12 is provided with ports 18 and 20, at the opposite ends thereof and on opposite sides of the piston 14. The gun 10 is of conventional construction.

The fluid under pressure is supplied from a tank or reservoir 22 which contains a suitable supply of fluid, preferably oil. A low pressure pump 24 is driven by a suitable prime mover 26, which may be an electric motor, the inlet of the pump being in communication with the oil within the tank 22 through a conduit 28. The outlet of the pump 24 has a conduit 30 associated therewith which has an overload relief valve 32 inserted therein. Such valve 32 is of conventional construction, and has a return conduit 34 to the pump for recirculation. The conduit 30 leads to a low pressure accumulator 36 through a branch conduit 38 and has an unloading valve 40 and a check valve 42 associated therewith and located in the order named between the overload relief valve 32 and the accumulator 36. The check valve 42 permits the flow of low pressure fluid to the low pressure accumulator but prevents the return of flow through conduit 30. A conduit 44 is connected to the accumulator conduit 38 and to an inlet port in the control panel generally indicated at 46, for the supply of low pressure from the accumulator 36 to the control panel 46. The low pressure supplied to the panel 46 may be at 1000 lbs. per square inch, for example.

A high pressure pump 48 is also associated with the tank 22 for supplying high pressure to a high pressure accumulator 50. The high pressure pump is driven by a prime mover 26' and is connected to the tank 22 by an inlet conduit, and to the high pressure accumulator 50 by a conduit having an overload relief valve, an unloading valve, and a check valve inserted therein, which are substantially the same as corresponding elements in the low pressure line, except that they are designed for the higher pressure, and which are indicated by similar primed numerals.

The high pressure fluid from the accumulator 50 may be at 5000 lbs. per square inch, for example, and is supplied to the control panel 46 through a conduit 52 which communicates with the high pressure accumulator conduit 38.

Low pressure is thereby supplied to the control panel 46 through the conduit 44 and high pressure fluid is supplied to the panel 46 through conduit 52.

A conduit 54 communicates with the interior of the cylinder 12 on the rod side of the piston 14; and a conduit 56 communicates with the interior of the cylinder 12 on the opposite side of the piston 14. The conduits 54 and 56 communicate with conduits 58 and 60, respectively, formed in the control panel 46 through suitable ports in the walls thereof.

The control panel 46 comprises a housing formed with control valves generally indicated at 62, 64, 66, and 68. Valve 68 includes a bore 69 formed with ports 70, 72, and 74 therein and has a spool 76 reciprocably disposed therein. Port 70 is cored and is in direct communication with low pressure inlet conduit 44, and port 74 is in direct communication with a conduit 78 which returns directly to the tank.

Valve 66 includes a longitudinal bore 79 and is formed with ports 80, 82, and 84 and has a reciprocable spool 86 disposed therein.

Valve 64 includes a bore 87 having ports 88, 90, and 92 formed therein and has a reciprocable piston 94 disposed therein.

Valve 62 includes a bore 95 having ports 96 and 98 formed therein and having a reciprocable spool 99 disposed therein. The spool 99 has a reduced end portion 101 formed on one end thereof which is received within a bore 102 formed in the housing and which has a purpose to be described hereinafter.

A relatively light coil spring 104 is disposed between the opposite end of the spool 99 and the opposite end of the bore so as to urge the spool to the position shown in Figure 2 to thereby prevent drift of the spool 99. The port 70 of valve 68 communicates with the port 88 of valve 64 through conduit 106. Port 70 is cored so that lower pressure line 44 communicates with conduit 106 through port 70 regardless of the position of spool 76. Port 72 of valve 68 communicates with port 80 of valve 66 through conduit 108. Port 90 of valve 64 communicates with port 98 of valve 62 through conduit 110. Port 96 of valve 62 communicates directly with conduit 58. Port 82 of valve 66 communicates with conduit 60, which communicates with conduit 58 leading to the free end of the cylinder 12. Port 92 of valve 64 communicates with conduit 112, which communicates with a conduit 114 leading back to the tank. Port 84 of valve 66 communicates with a conduit 116, which communicates with a conduit 52 leading to the high pressure source.

Pilot means are provided for automatically shifting the valves 62, 64, 66, and 68 and for operating the solenoid, and such pilot means include a pilot solenoid valve generally indicated at 118. The valve 118 includes a bore having ports 120, 122, and 124 and has a spool 126 reciprocably disposed therein. Spool 126 is connected to a reciprocating shaft 128, which is connected to the movable element of a conventional solenoid 130. The solenoid 130 is connected to a suitable source of electric energy through an electric control panel, described hereinafter, so that when the push button 132 on the gun 10 is actuated the solenoid is energized to shift the spool 126 to the right to the position shown in Figure 2.

Port 120 communicates with a pilot conduit 134, which communicates with another conduit 136 formed in the housing adjacent the lower ends of the bores 87, 79, and 69. Such passageway 136 is in open communication with the lower ends of the bores of the three valves mentioned.

Port 122 communicates with conduit 138 which communicates with a conduit 140. Such conduit 140 may be a branch conduit from the low pressure conduit 44 and be in open communication therewith. Port 124 communicates with a conduit 142 which is in open communication with the upper end of the bore 95 of valve 62, and which is also in open communication with branch conduit 144. The branch conduit 144 is in communication with the upper end of the bore 69 of valve 68.

The right end (viewing Figure 2) of the bore of pilot valve 118 communicates with a conduit 146, which communicates with the tank through a conduit 148 and also communicates with the lower end of the bore of valve 62. The spool 126 is urged to the left (viewing Figure 2) by means of a coil spring 150. When the solenoid is de-energized, the spring 150 acts to move the spool 126 to the left so as to communicate ports 120 and 122 and communicate conduit 142 with conduit 148.

The spool 126 is formed with a bore 149 opening through one end thereof and communicating with the conduit 148. The spool 126 is also formed with a plurality of radial apertures 151 therethrough which communicate the bore 149 with port 120 and conduit 134 when the spool is in the position shown in Figure 2.

Port 80 of valve 66 is in communication with a pilot conduit 152 which is in open communication with a chamber 154. Such chamber 154 is in communication with a pilot conduit 156 through ball check valves 158 and 160. The ball checks 158 and 160 function in opposite directions, as shown in Figure 2. The conduit 156 is in open communication with a conduit 162 which opens into the upper end (viewing Figure 2) of the bore 95 of valve 64. The conduit 156 is also in communication with the upper end (viewing Figure 2) of the bore 79 of valve 66. A restricting element 164 is disposed in the branch of the conduit 156 leading to the bore of valve 66 so that there will be a time lag in the movement of spool 86, as will be pointed out hereinafter.

At one stage of the operation, the solenoid is actuated by a pressure switch 166 having conduits 168 and 170 associated therewith. The conduit 170 returns to a drain, while the conduit 168 communicates with a plunger chamber 172 formed in the control panel 46. The chamber 172 is in the form of a cylindrical bore and has a piston 174 slidably disposed therein. The rod end 176 of the piston 174 is slidably received within a chamber 180 of reduced diameter. The chamber 180 communicates with the tank through a conduit 182 and the end of the chamber 180 communicates with conduit 60 through a branch conduit 184.

The conduit 44 communicates with the chamber 172 through a conduit 186 which has a ball check valve 188 disposed therein and operable in the direction indicated in Figure 2.

Bore 102, at the lower end of spool 99, communicates with a conduit 190 which communicates with conduit 110 through a conduit 192 having a check valve 194 therein. The conduit 190 also communicates with conduit 192 through conduit 196 having a check valve 198 therein. The check valves 194 and 198 are operable in opposite directions as shown in Figure 2.

In Figure 3, an electric control panel for controlling the operation of the motors 26 and 26', the solenoid 130, and the pressure switch 166 is diagrammatically illustrated. Electric energy is conducted to the electric panel through suitable leads from a suitable source. Motor start and stop buttons are indicated at 201 and 202, respectively. The diagram is illustrated with the operating elements in their non-operating positions. With the start button 201 actuated to close the circuit, coils or relays R1 and R2 are energized to close the normally open, holding circuit contact R1a and to close the normally open contacts R1b, R1c, R2a, R2b, and R2c. When the start button 201 is released, the circuit will be held through contact R1a. The low pressure pump motor 26 and the high pressure pump motor 26' will thus operate to supply the low and high pressure to the accumulators in the fluid circuit described above. When the stop button 202 is actuated, the circuit is opened, de-energizing coils R1 and R2 thereby opening contacts R1a, R1b, R1c, R1d, R2a R2b, and R2c to stop motors 26 and 26'. The motors are, of course, operated during the use of the gun 10.

When the push button 132 is actuated to operate the gun 10, the circuit is closed to energize coil or relay R3. Normally open contacts R3a and R3b are then closed. Normally closed contact R4a remains closed and the solenoid 130 is energized to shift the spool 126 to the right to the position shown in Fig. 2. The panel 46 then operates hydraulically, in a manner to be described in detail hereinafter, so that the pressure switch 166 is closed to energize relay or coil R4. When coil R4 is energized, normally closed contact R4a is open and holding circuit contact R4b is closed. The button 132 is held closed by the operator during the riveting operating, so that contacts R3a and R3b remain closed. When contact R4a is opened, solenoid 130 is de-energized, so that the spool 126 is shifted to the left, viewing Figure 2. Coil R4 still remains energized, even though the pressure switch 166 drops out of contact, through holding contact R4b. The time element is immaterial in holding contact R4b closed, so that a cycle cannot repeat itself until this contact R4b is opened. When the operator releases push button 132, its line is opened, de-energizing coil R3. When coil R3 is de-energized, contact R3a opens and contact R3b also opens, causing coil R4 to become de-energized. When coil R4 is de-energized, contact R4b opens and normally closed contact R4a closes. The elements for the control of the solenoid 130 and the pressure switch 166 thus return to their original positions, and the cycle may be repeated when the operator closes push button 132.

In the operation of the entire fluid circuit, including the operation of the panel 46, when the push button 132 is held closed by the operator, which must be maintained through the entire compression of the rivet, the electric circuit acts as described above to shift the spool 126 to the position shown in Figure 2. The pumps 24 and 48 are, at the time, in operation to supply fluid to the low pressure accumulator 36 and the high pressure accumulator 50. Fluid under the low and high pressure is thus available to the panel 46 through conduits 44 and 52, respectively.

With the spool 126 in the position shown in Fig. 2, low pressure fluid enters conduit 140 and passes into conduits 142 and 144 through ports 122 and 124. Spools 99 and 76 are then moved to the positions shown in Figure 2. Spools 94 and 86 remain in the positions shown in Figure 2. As the spool 99 moves downwardly, the fluid in the lower end of the bore exhausts to tank through conduits 144, 146, and 148; and the fluid under the reduced end 101 exhausts through conduits 190, check valve 198, and conduits 196 and 192 into conduit 110. The fluid may flow from conduit 110 along with the fluid from line 54, as will be pointed out hereinafter.

The fluid under spool 76 passes through conduits 136 and 134 into port 120, through apertures 151 into the bore 149, and back to the tank through conduits 146 and 148.

With the spools in the positions described, high pressure fluid from conduit 52 is stopped in its flow by the position of spool 86. Low pressure fluid from conduit 44 passes through ports 70 and 72, into conduit 108, into port 80, and passes out of port 82 into conduit 60, and from there into conduit 56 to the cylinder through port 18. The conduit 44 is, at the same time, open to conduit 54, but, due to the differential total pressures acting on the opposite sides of the piston 14, such piston will move in the direction of the arrow on rod 16. The fluid in the cylinder 12 on the rod side of the piston will then flow through conduit 54, in the direction of the arrows of Fig. 2, through conduit 58, into port 96, out of port 98, into conduit 110, into port 90, out of port 88, into conduit 106, into port 70, and out of port 72 along with the fluid from conduit 44. Such fluid also carries with it the fluid from conduit 192. This differential feed gives a relatively high speed feed of the piston 14 to the work position at a low pressure.

When the piston 14 moves to the work position in the direction indicated and against the work, the pressure in pilot line 152, which communicates with the low pressure line through port 80, builds up to a predetermined panel setting depending upon the adjustment of a check valve 158 to open check valve 158 and pass fluid into conduits 156 and 162. Passage of the fluid into these conduits causes spool 94 to move downwardly to the bottom of bore 87, and this shuts off communication between conduits 106 and 110. Fluid from one branch of conduit 156 passes through restriction 164 to cause spool 86 to move downwardly to the bottom of bore 79. Fluid under spools 94 and 86 returns to the tank through conduit 136, conduit 134, apertures 151, bore 149, and conduits 146 and 148.

With the spools 94 and 86 in the down position just described, the supply of low pressure fluid from conduit 44 is cut off to the cylinder 12 by spools 86 and 94. However, high pressure fluid from conduit 52 then passes through conduit 116 into port 84 of valve 66 and out of port 82 into conduit 60. The fluid passes from the conduit 60 through conduit 56 and into the cylinder 12 through port 18, so that the work is done at the high pressure. Fluid may then exhaust from the rod side of the piston 14, through conduits 54 and 58, into port 96 of valve 62, out of port 98 into conduit 110, into port 90 of valve 64, out of port 92 and into conduit 112, which returns to the tank through conduit 114.

The operating plunger 174, which operates the pressure switch 166, is held in the position shown in Figure 2 by the low pressure from line 44 through conduit 186 and check valve 188. As the high pressure fluid builds up in conduit 60 at the end of the work stroke or due to the resistance to riveting pressure, such fluid passes into chamber 180 and moves the plunger 174 to the right, viewing Figure 2. The fluid within chamber 172 then passes through conduit 168 to the pressure switch 166, and actuates such switch to de-energize the solenoid 130, as described above.

When the solenoid 130 is de-energized, the spool 126 moves to the left, viewing Figure 2, and low pressure fluid enters through conduits 140 and 138 into port 122 and out of port 120 into conduit 134. Such fluid then acts through conduit 136 to shift spools 94, 86, and 76 to their upper positions. When spool 86 is in its upper position, the flow of high pressure fluid from conduit 52 is cut off from flow to conduit 60. Fluid within the bores above spools 94 and 86 exhausts through conduit 156, check valve 160, conduit 152, conduit 108, into port 72 of valve 68 and out of port 74 into conduit 78, which returns to the tank.

As the spool 76 moves to its upper position, the fluid in the bore above the spool exhausts through conduits 144 and 142, into port 124, and to the tank through conduits 146 and 148.

When the plunger 76 is in its upper position, the low pressure line 44 is still in communication with the conduit 106 through the cored port 70, which surrounds the lower portion of the spool 76 in spaced relation thereto when such spool is in its upper position. The low pressure fluid from conduit 106 then passes through valve 64 into conduit 110, and from conduit 110 through valve 62 into conduits 58 and 54. The fluid enters the cylinder 12 through port 20 and forces the piston 14, together with the rod 16, to its retracted position. When the piston 14 reaches its limit of movement, pressure builds up in conduit 110 to a predetermined panel setting depending upon the adjustment of check valve 194, and the fluid flows from such conduit 110 through conduit 192, through check valve 194, into conduit 190 and acts upon the lower reduced end 101 of the spool 99 to move such spool upwardly. The fluid above the upper end of spool 99 exhausts through conduit 142, port 124, and conduits 146 and 148. When the spool 99 moves upwardly, the flow of low pressure fluid is cut off to the rod end of the cylinder. This is the end of the cycle, and, when the solenoid 130 is again energized, the cycle is repeated.

The terms "upper" and "lower," as used above, are not intended to be limiting, but are merely used in a descriptive way to indicate relative positions on the drawing illustrations.

What is claimed is:

1. In a fluid power transmission for driving a reciprocating fluid motor including a cylinder, piston and piston rod, the combination of first means providing a source of fluid at one pressure, second means providing a source of fluid at another pressure, fluid supply and return connections between said first and second means and the motor, and control means disposed in said connections for controlling the operation of said motor, said control means including valve means to admit fluid from said first means to said cylinder to advance said piston to one position, pilot means responsive to the pressure from said first means upon a predetermined pressure rise due to resistance to advance of said piston to shift said valve means so as to admit fluid from said second means to said cylinder to further advance said piston, and pilot means actuated in response to the pressure from said second means when the pressure in the high pressure line reaches a predetermined value to shift said valve means to cut off flow from said second means to said cylinder and to admit fluid from said first means to said cylinder on the opposite side of the piston.

2. In a fluid power transmission for driving a reciprocating fluid motor including a cylinder, piston and piston rod, the combination of first means providing a source of fluid at relatively low pressure, second means providing a source of fluid at relatively high pressure, fluid supply and return connections between said first and second means and the motor, and control means disposed in said connections for controlling the operation of said motor, said control means including valve means to admit fluid from said first means to said cylinder to advance said piston to one position, pilot means responsive to the pressure from said first means upon a predetermined pressure rise due to resistance to advance of said piston to shift said valve means so as to admit fluid from said second means to said cylinder to further advance said piston, and pilot means actuated in response to the pressure from said second means when the pressure in the high pressure line reaches a predetermined value to shift said valve means to cut off flow from said second means to said cylinder and to admit fluid from said first means to said cylinder on the opposite side of the piston.

3. In a fluid power transmission for driving a reciprocating fluid motor including a cylinder, piston and piston rod, the combination of first means providing a source of fluid at relatively low pressure, second means providing a source of fluid at relatively high pressure, fluid supply and return connections between said first and second means and the motor, and control means disposed in said connections for controlling the operation of said motor, said control means including valve means to admit fluid from said first means to said cylinder to advance said piston to one position, pilot means responsive to the pressure from said first means upon a predetermined pressure rise due to resistance to advance of said piston to shift said valve means so as to admit fluid from said second means to said cylinder to further advance said piston, and electrically operated pilot means actuated in response to the pressure from said second means when the pressure in the high pressure line reaches a predetermined value to shift said valve means to cut off flow from said second means to said cylinder and to admit fluid from said first means to said cylinder on the opposite side of the piston.

4. In a fluid power transmission for driving a reciprocating fluid motor including a cylinder, piston and piston rod, the combination of first means providing a source of fluid at relatively low pressure, second means providing a source of flud at relatively high pressure, fluid supply and return connections between said first and second means and the motor, and control means disposed in said connections for controlling the operation of said motor, said control means including a plurality of valves, electrically responsive pilot means to shift certain of said valves to admit fluid from said first means to said cylinder to advance said piston to one position when said pilot means is in one position, pilot means responsive to the pressure from said first means upon a predetermined pressure rise due to resistance to advance of said piston to shift certain of said valves so as to admit fluid from said second means to said cylinder to further advance said piston, and pilot means actuated in response to the pressure from said second means when the pressure in the high pressure line reaches a predetermined value to shift said first named pilot means to another position to thereby shift certain of said valves to cut off flow from said second means to said cylinder and to admit fluid from said first means to said cylinder on the opposite side of the piston.

5. In a fluid power transmission for driving a reciprocating fluid motor including a cylinder, piston and piston rod, the combination of first means providing a source of fluid at relatively low pressure, second means providing a source of fluid at relatively high pressure, fluid supply and return connections between said first and second means and the motor, and control means disposed in said connections for controlling the operation of said motor, said control means including valve means, electrically responsive pilot means to shift said valve means to admit fluid from said first means to said cylinder to advance said piston to one position when said pilot means is in one position, pilot means responsive to the pressure from said first means upon a predetermined pressure rise due to resistance to advance of said piston to shift said valve means so as to admit fluid from said second means to said cylinder to further advance said piston, and a pressure switch actuated in response to the pressure from said second means when the pressure in the high pressure line reaches a predetermined value to affect operation of said first named pilot means to shift said first named pilot means to another position to thereby shift said valve means to cut off flow from said second means to said cylinder on the opposite side of the piston.

6. In a fluid power transmission for driving a reciprocating fluid motor including a cylinder, piston and piston rod, the combination of first means providing a source of fluid at relatively low pressure, second means providing a source of fluid at relatively high pressure, fluid supply and return connections between said first and second means and the motor, and control means disposed in said connections for controlling the operation of said motor, said control means including valve means open to admit fluid from said first means to both ends of said cylinder to obtain a differential advance of said piston to one position, pilot means responsive to the pressure from said first means upon a predetermined pressure rise due to resistance to advance of said piston to shift said valve means so as to admit fluid from said second means to said cylinder to further advance said piston, and pilot means actuated in response to the pressure from said second means when the pressure in the high pressure line reaches a predetermined value to shift said valve means to cut off flow from said second means to said cylinder and to admit fluid from said first means to said cylinder on the opposite side of the piston.

7. In a fluid power transmission for driving a reciprocating fluid motor including a cylinder, piston and piston rod and having an electric operating element, the combination of first means providing a source of fluid at relatively low pressure, second means providing a source of fluid at relatively high pressure, fluid supply and return connections between said first and second means and the motor, and control means disposed in said connections for controlling the operation of said motor, said control means including valve means, solenoid pilot means to shift said valve means to admit fluid from said first means to said cylinder to advance said piston to one position when said pilot means is in one position, pilot means responsive to the pressure from said first means upon a predetermined pressure rise due to resistance to advance of said piston to shift said valve means so as to admit fluid from said second means to said cylinder to further advance said piston, a pressure switch actuated in response to the pressure from said second means when the pressure in the high pressure line reaches a predetermined value to de-energize said solenoid pilot means to shift said first named pilot means to another position to thereby shift said valve means to cut off flow from said second means to said cylinder and to admit fluid from said first means to said cylinder on the opposite side of the piston, and means forming an electric circuit operable upon actuation of said operating element to energize said solenoid pilot means to initiate the cycle of operation of the control means, said electric circuit being such that a cycle of operation cannot repeat without releasing said electric operating element.

8. A control panel for use in a fluid power transmission system for driving a reciprocating fluid motor at a low pressure and a high pressure, including a housing having a plurality of valves therein, means to admit fluid from said first means to said cylinder to advance said piston to one position, pilot means responsive to the pressure from said first means upon a predetermined pressure rise due to resistance to advance of said piston to shift said valve means so as to admit fluid from said second means to said cylinder to further advance said piston, and pilot means actuated in response to the pressure from said second means when the pressure in the high pressure reaches a predetermined value to shift said valve means to cut off flow from said second means to said cylinder and to admit fluid from said first means to said cylinder on the opposite side of the piston.

9. A control panel for use in a fluid power transmission system for driving a reciprocating fluid motor at a low pressure and at a higher pressure comprising a housing having a plurality of valves therein, electrically responsive pilot means to shift certain of said valves to admit low pressure fluid from one source, pilot means responsive to a predetermined pressure value of the low pressure fluid to shift certain of said valves so as to admit higher pressure fluid from another source, and pilot means actuated in response to a predetermined pressure in the higher fluid pressure source to shift said first named pilot means to another position to thereby shift certain of said valves to cut off flow from said another source and to admit fluid from said one source.

HARRY L. WISE.

CERTIFICATE OF CORRECTION.

Patent No. 2,356,366. August 22, 1944.

HARRY L. WISE.

It is hereby certified that error appears in the printed specification of the above numbered patent requiring correction as follows: Page 6, first column, line 2, claim 8, after the word "pressure" insert --line--; and that the said Letters Patent should be read with this correction therein that the same may conform to the record of the case in the Patent Office.

Signed and sealed this 10th day of October, A. D. 1944.

(Seal)

Henry Van Arsdale
Acting Commissioner of Patents.